Aug. 25, 1925.                    1,550,824
H. KUESTER
WIREWORKING MACHINE
Filed July 1, 1924          12 Sheets-Sheet 6
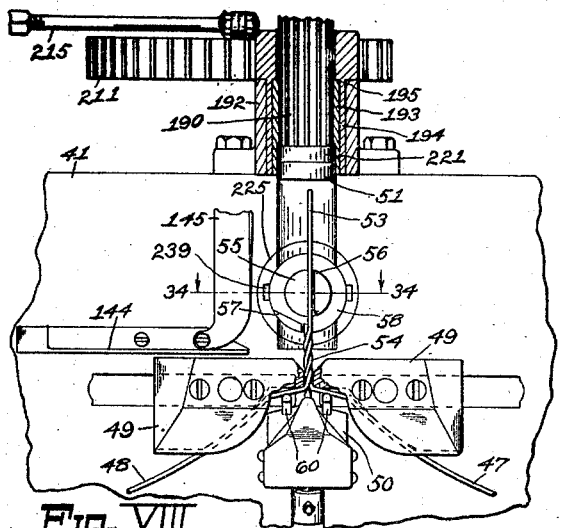
Fig. VIII
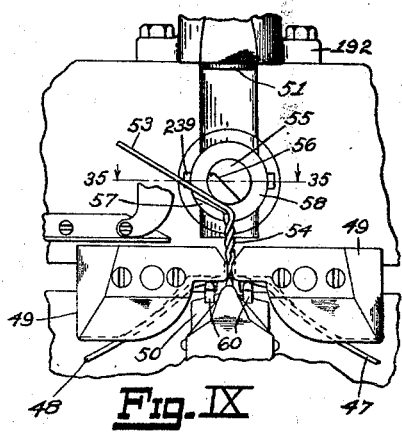
Fig. IX
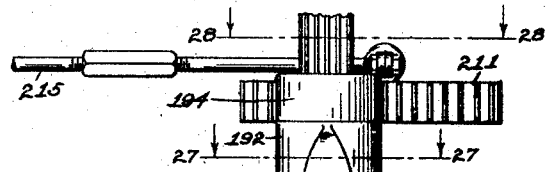
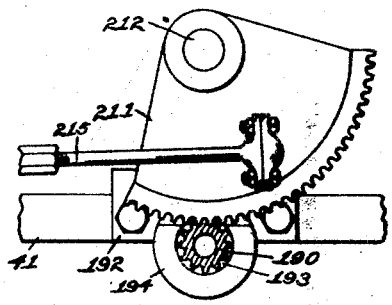
Fig. XXVIII
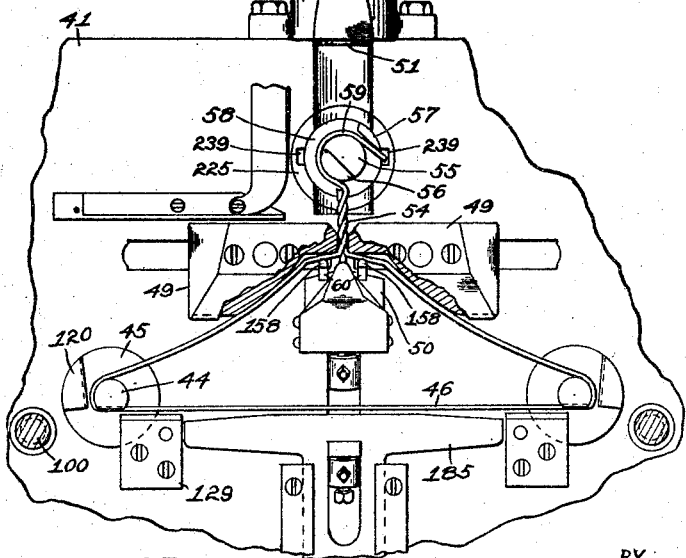
Fig. X
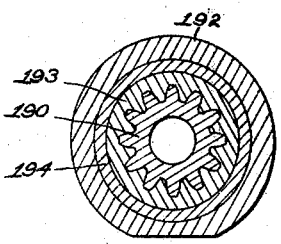
Fig. XXVII
INVENTOR.
Herman Kuester
BY
Chappell & Earl
ATTORNEYS

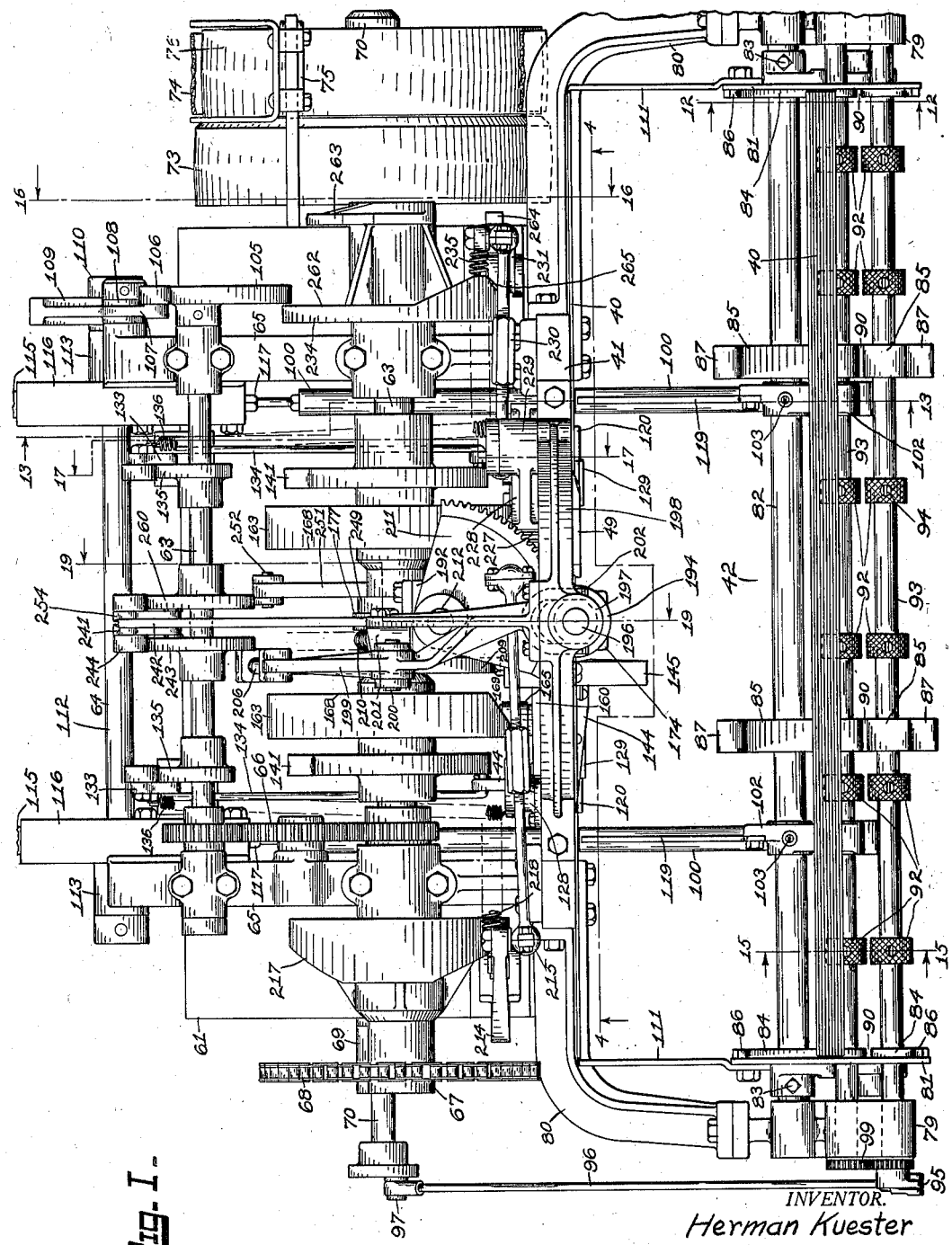

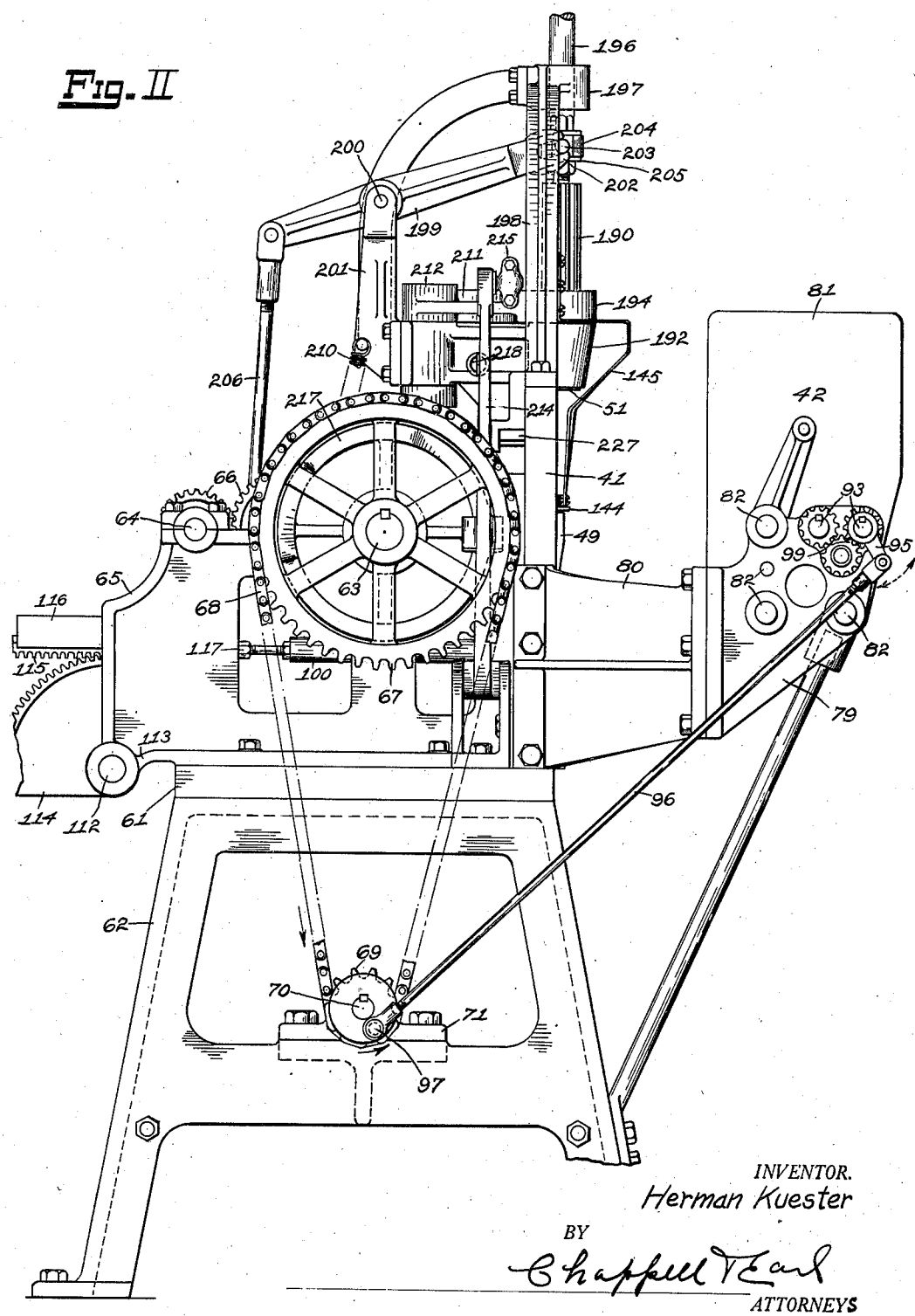

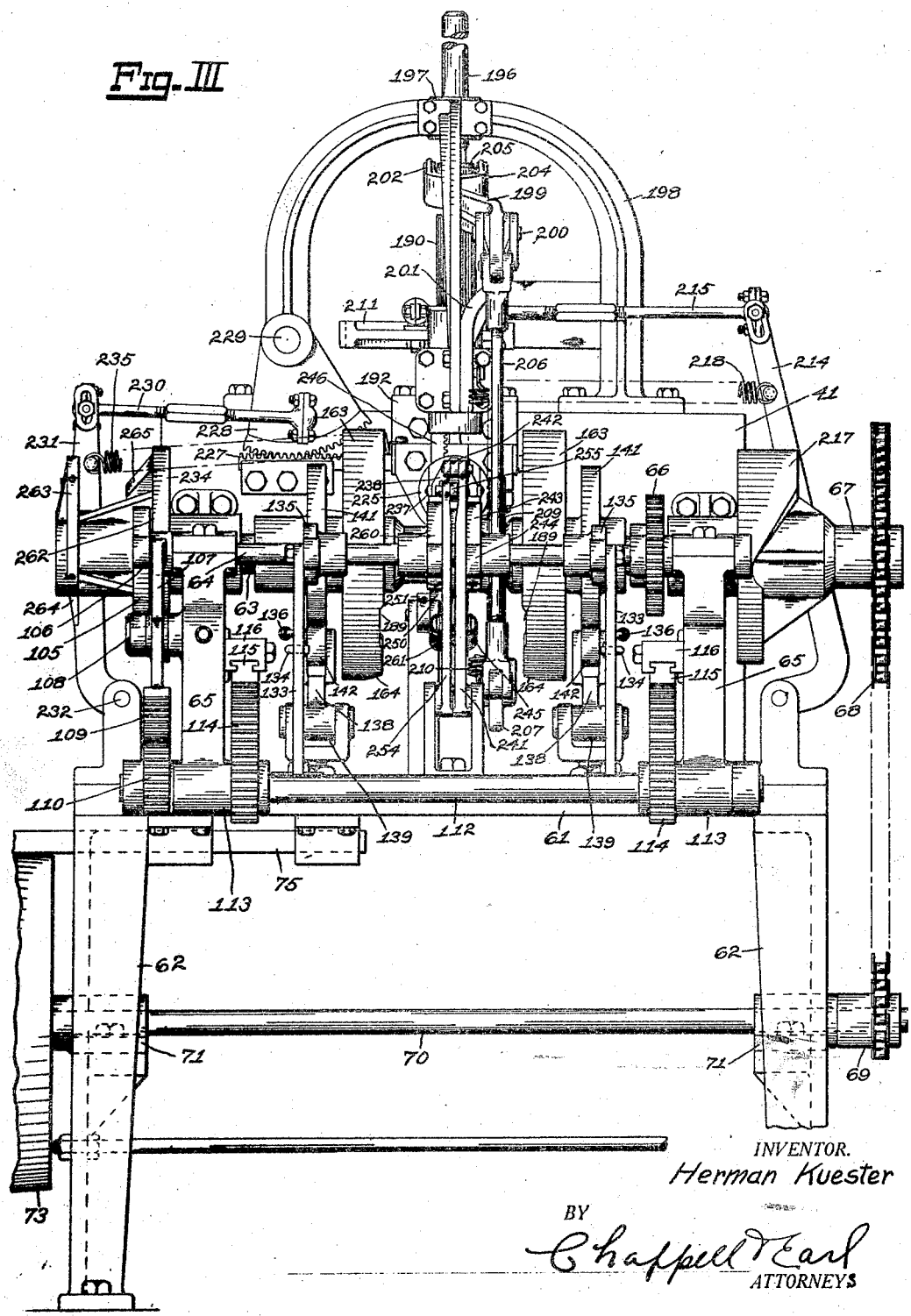

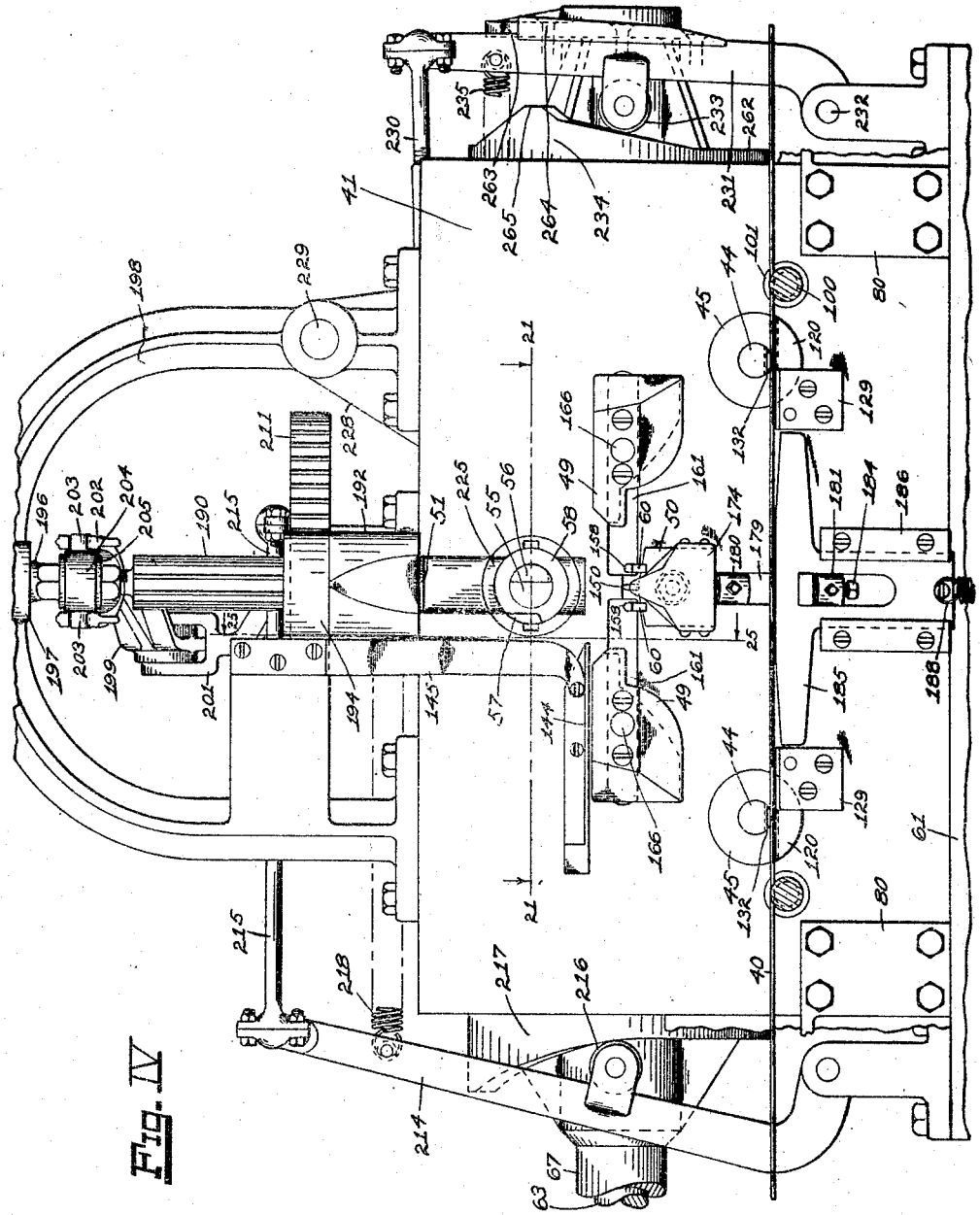

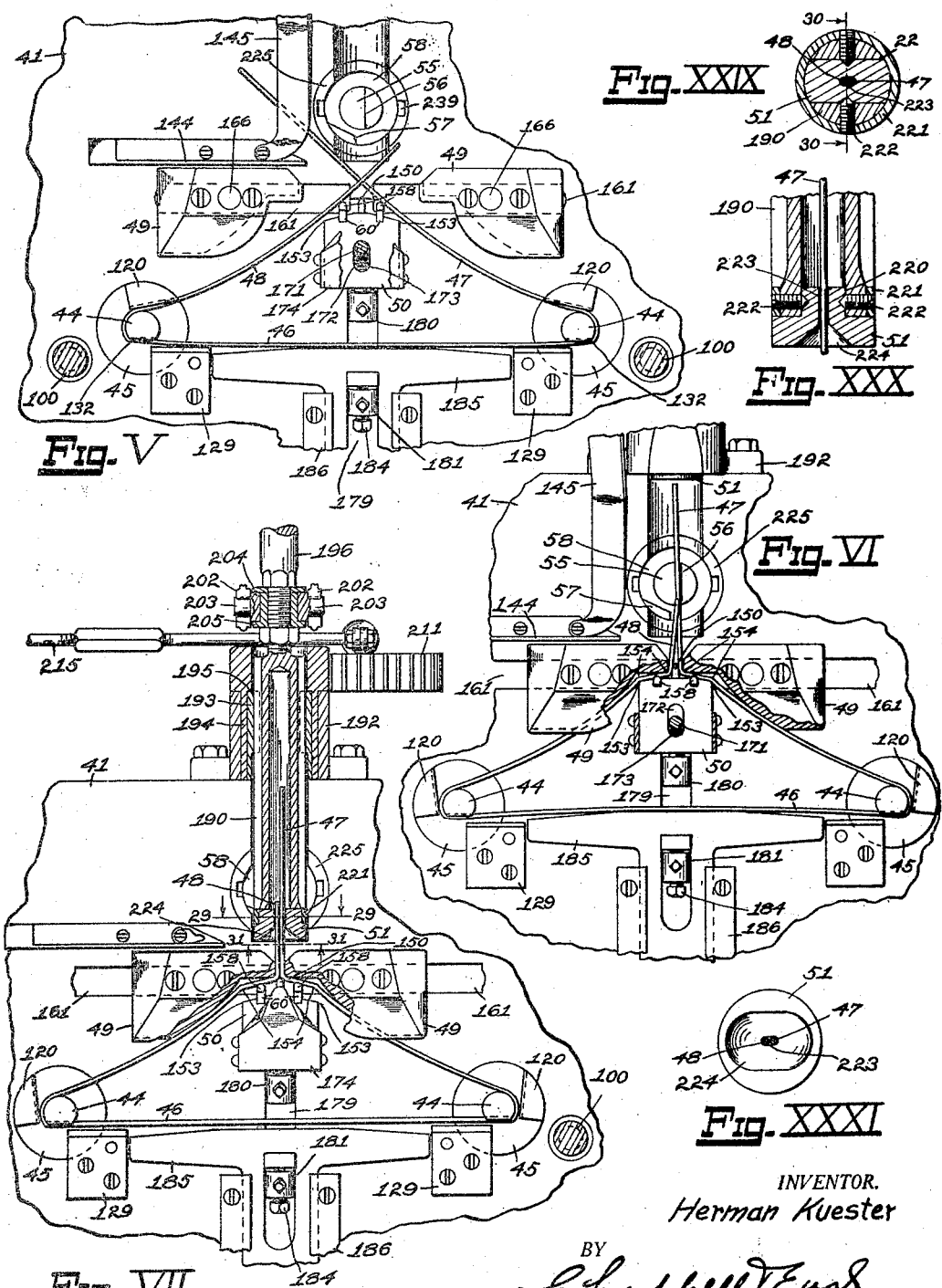

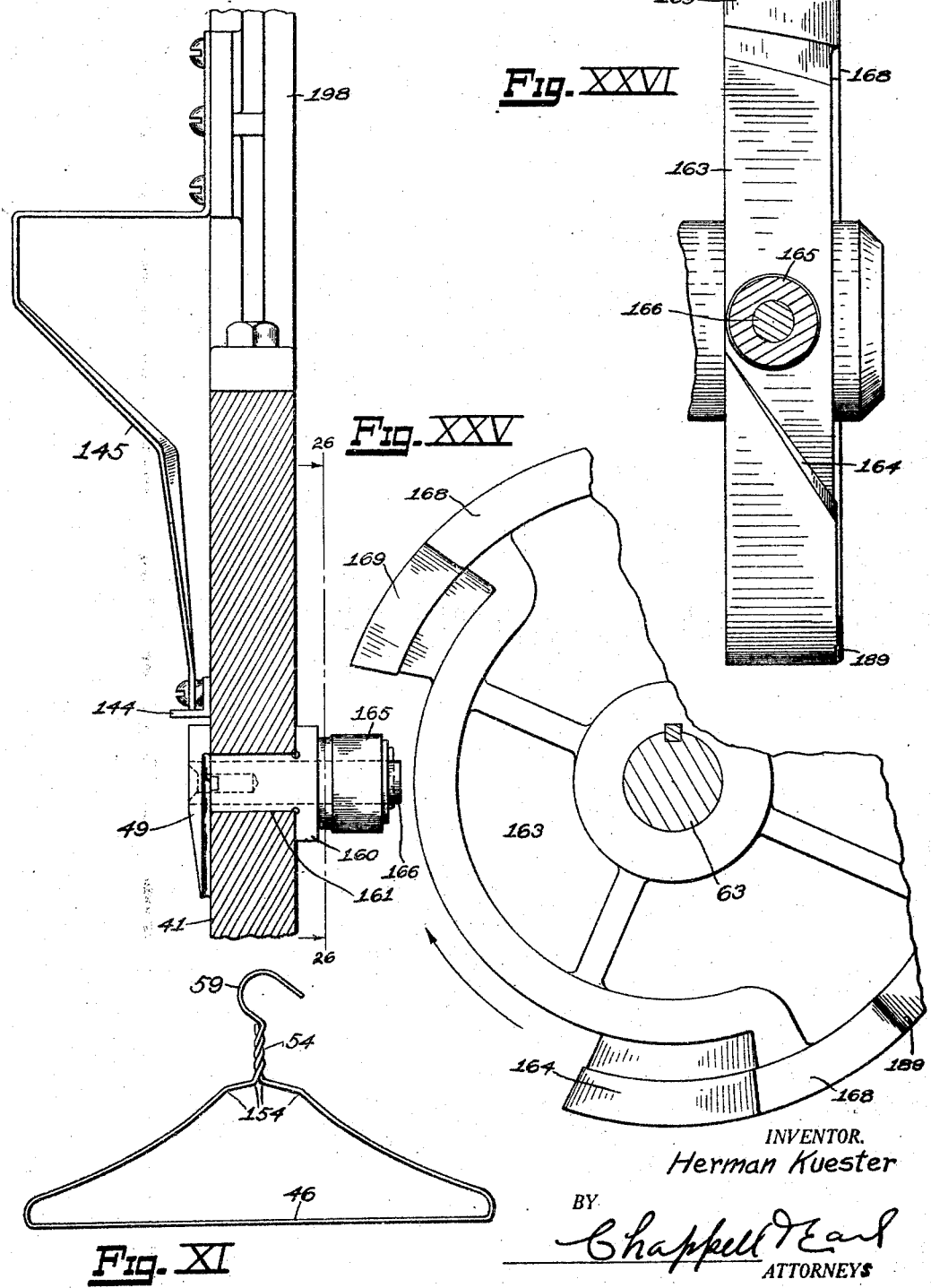

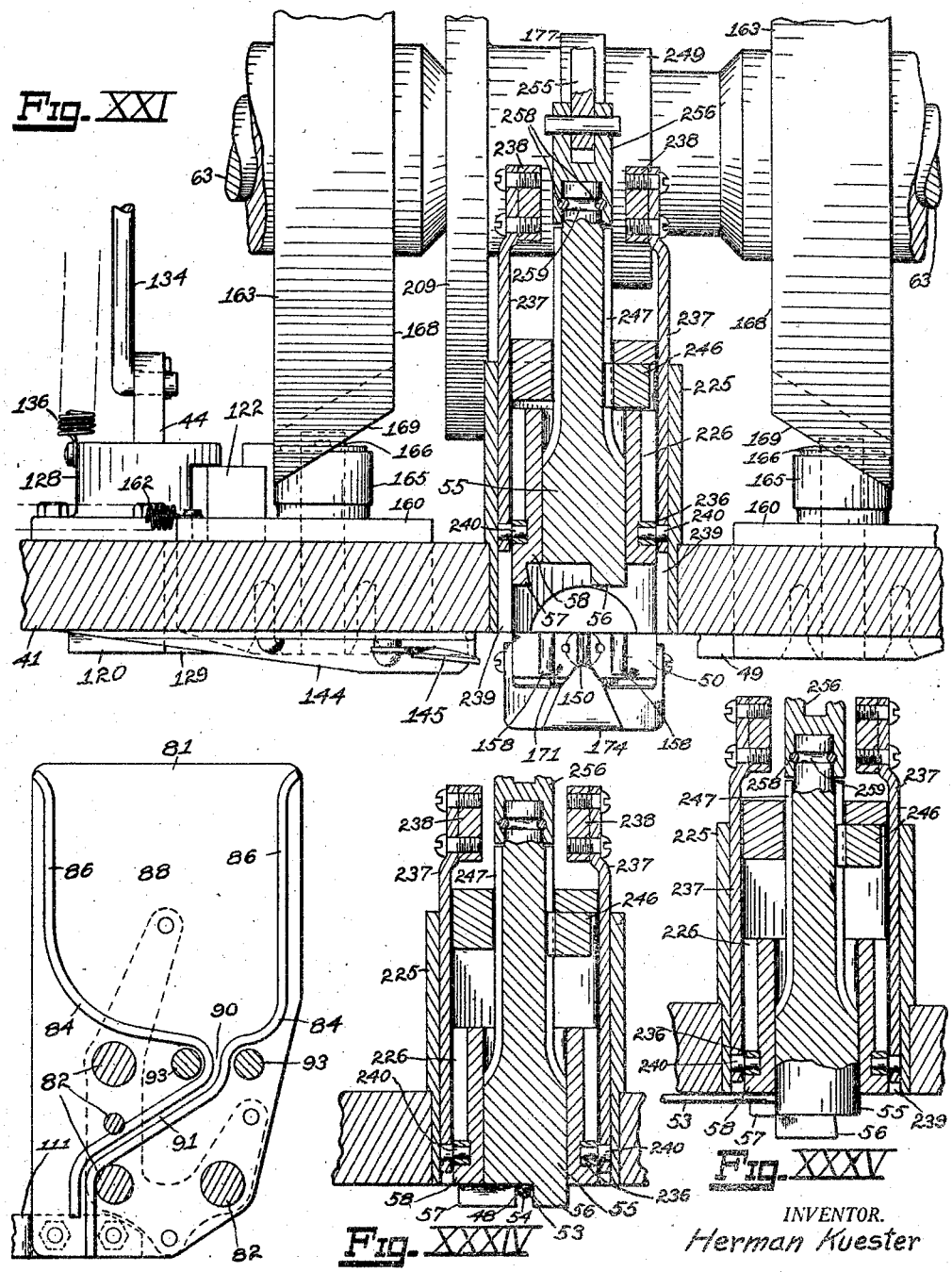

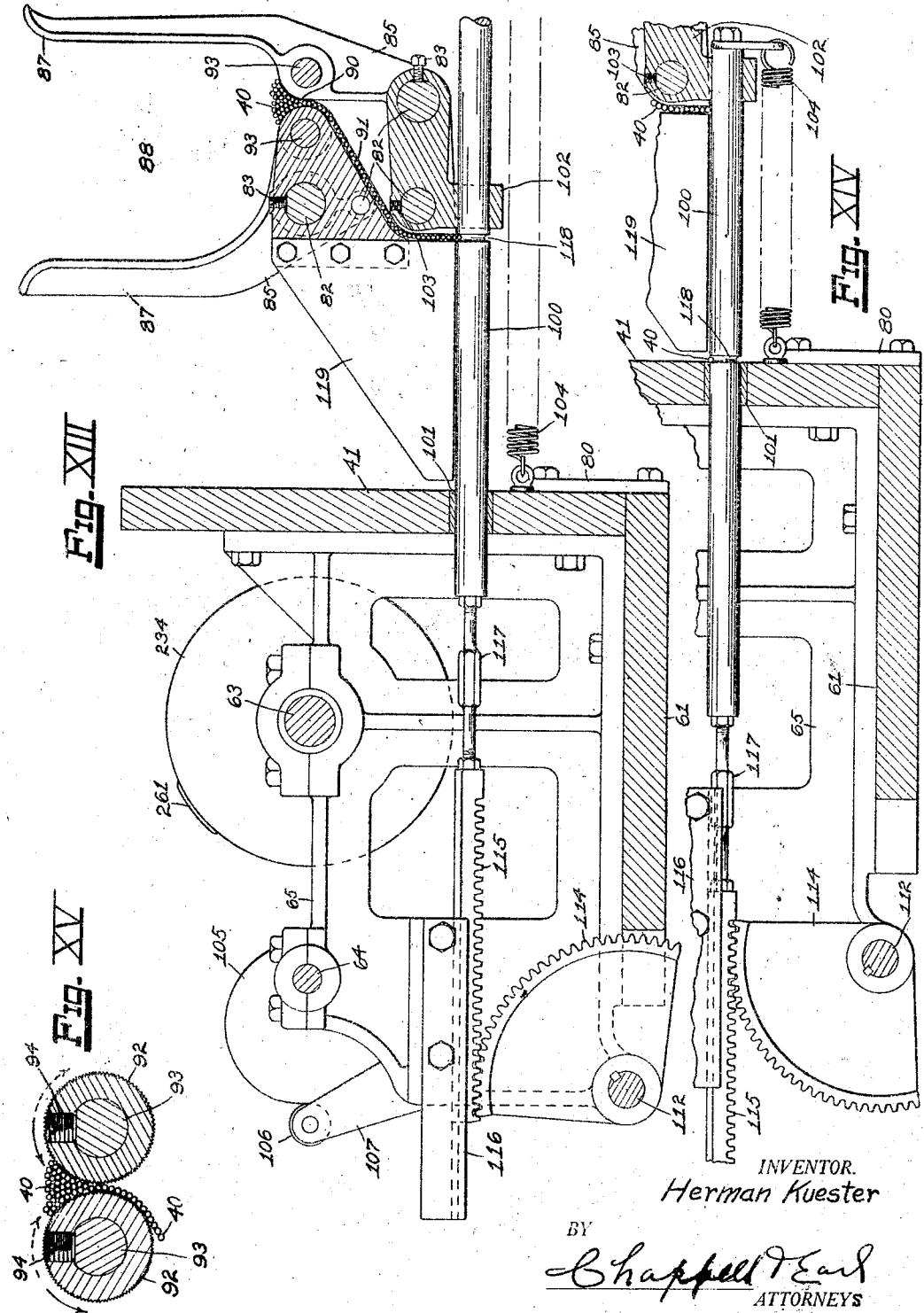

Aug. 25, 1925.
H. KUESTER
WIREWORKING MACHINE
Filed July 1, 1924 12 Sheets-Sheet 10
1,550,824
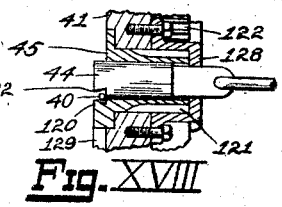
Fig. XVIII
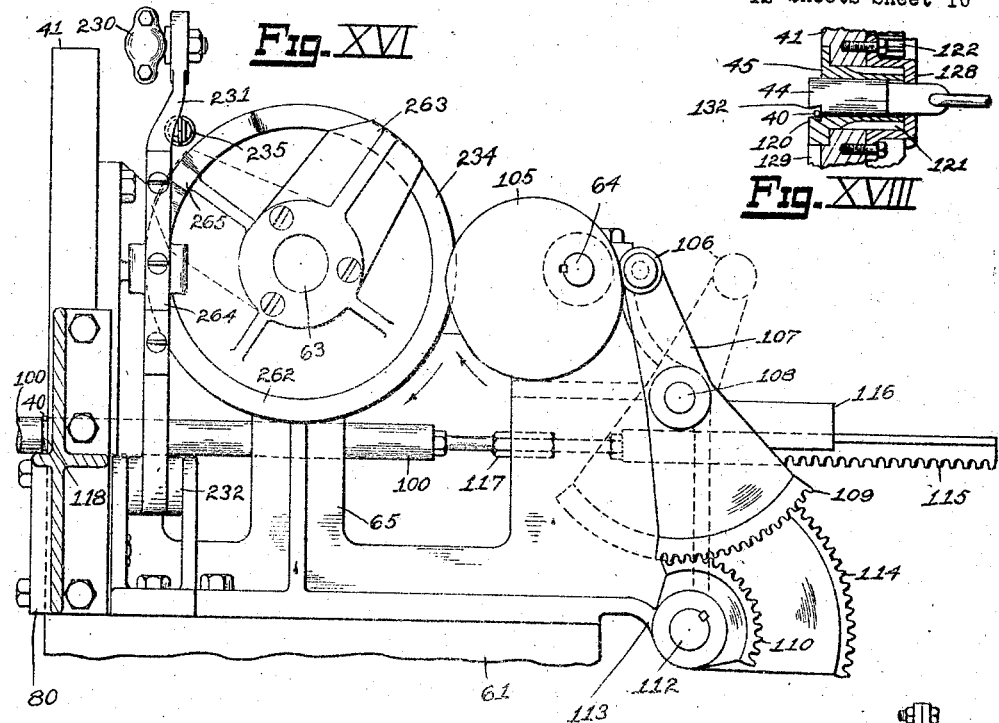
Fig. XVI
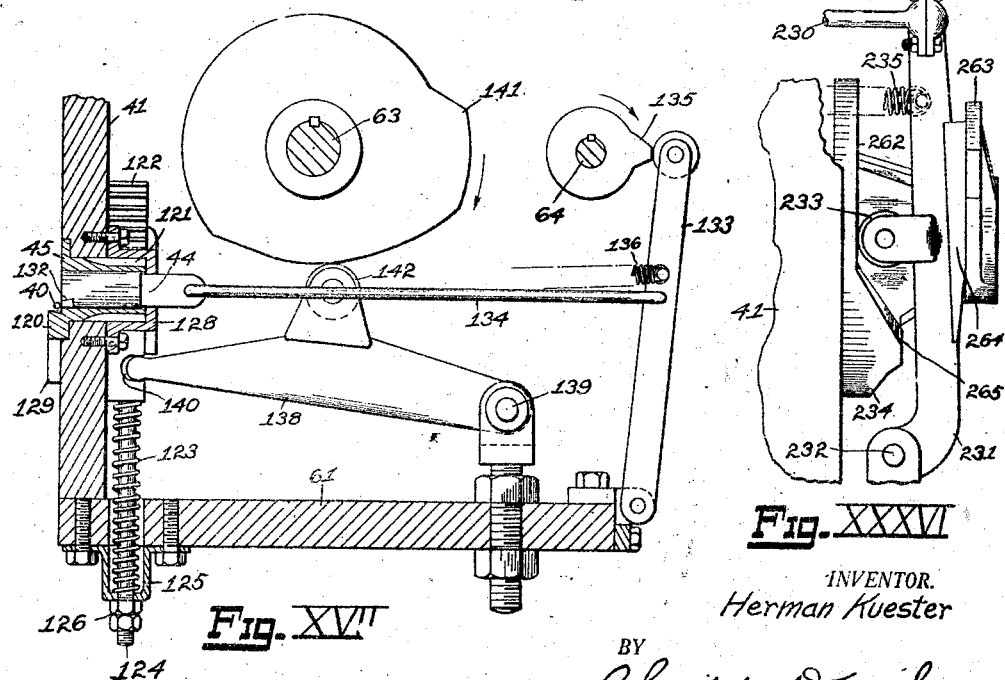
Fig. XVII
Fig. XXXVI
INVENTOR.
Herman Kuester
BY
Chappell & Earl
ATTORNEYS

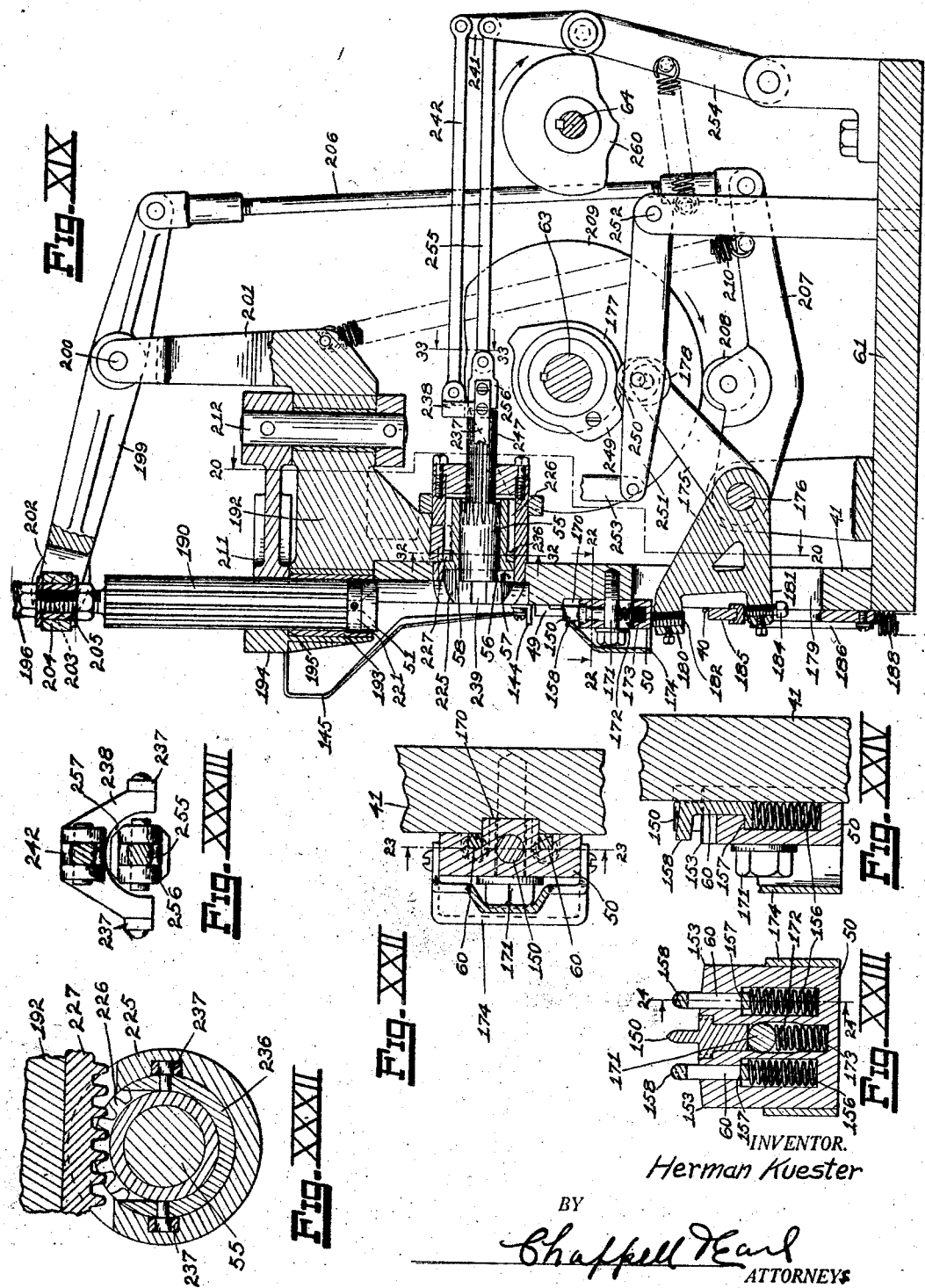

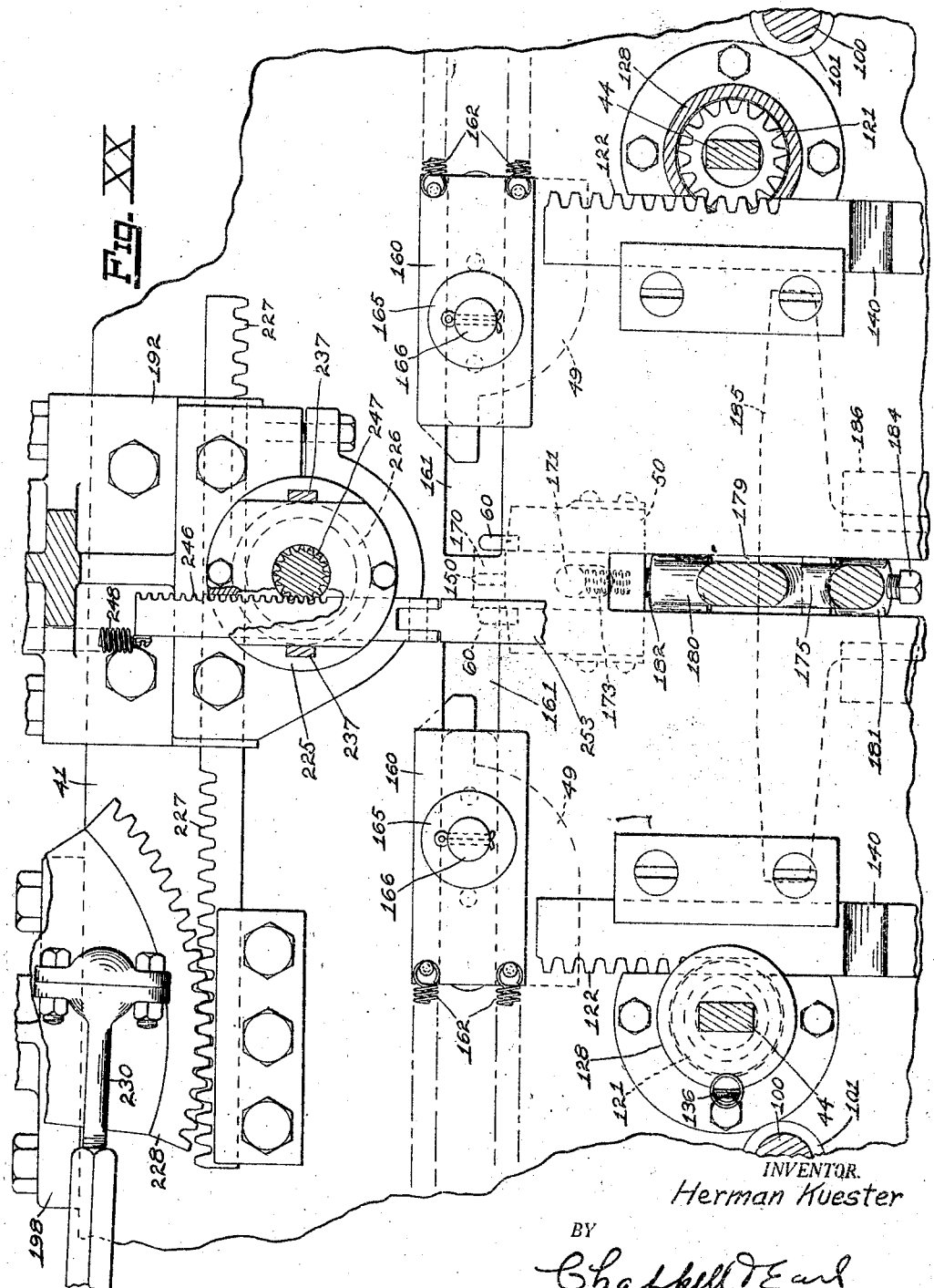

Patented Aug. 25, 1925.

1,550,824

UNITED STATES PATENT OFFICE.

HERMAN KUESTER, OF DETROIT, MICHIGAN, ASSIGNOR TO L. A. YOUNG INDUSTRIES, INCORPORATED, OF DETROIT, MICHIGAN.

WIREWORKING MACHINE.

Application filed July 1, 1924. Serial No. 723,512.

*To all whom it may concern:*

Be it known that I, HERMAN KUESTER, a citizen of the United States, residing at Detroit, county of Wayne, State of Michigan, have invented certain new and useful Improvements in Wireworking Machines, of which the following is a specification.

This invention relates to improvements in wire working machines.

My improvements relate particularly to machines for forming wire garment hangers such as are in quite general use, and I have illustrated and described my improvements as embodied in such a machine. Various features, however, are of use in other relations and readily adapted thereto.

The main objects of this invention are:

First, to provide an improved wire working machine for the purpose described which is capable of automatically forming all of the several operations in rapid succession.

Second, to provide an improved wire working machine in which the parts are compactly arranged and the successive operations are properly timed.

Third, to provide an improved wire working machine in which the working parts are of substantial size and not likely to get out of repair.

Objects pertaining to details and economies of construction and operation will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I, sheet 1, is a plan view of a machine embodying the features of my invention.

Fig. II, sheet 2, is an end elevation taken from the left of Fig. I.

Fig. III, sheet 3, is a rear elevation.

Fig. IV, sheet 4, is a fragmentary view partially in vertical section on a line corresponding to line 4—4 of Fig. I, with the forming members in open position.

Figs. V to X inclusive, sheets 5 and 6, are views similar to Fig. IV, illustrating consecutive stages in the forming of the article.

Fig. XI, sheet 7, is a view of a garment hanger formed by the machine.

Fig. XII, sheet 8, is an enlarged detail view partially in section on a line corresponding to line 12—12 of Fig. I, illustrating details of a wire magazine.

Fig. XIII, sheet 9, is an enlarged detail view in section on a line corresponding to line 13—13 of Fig. I, illustrating details of wire feeding and transfer mechanism.

Fig. XIV, sheet 9, is a detail sectional view similar to Fig. XIII, with parts in another position.

Fig. XV, sheet 9, is an enlarged vertical section on a line corresponding to line 15—15 of Fig. I, illustrating details of wire feed rollers.

Fig. XVI, sheet 10, is an enlarged view partially in elevation and partially in section on a line corresponding to line 16—16 of Fig. I, illustrating further details of the wire transfer mechanism and details of actuating means for the formers.

Fig. XVII, sheet 10, is an enlarged fragmentary view mainly in section on a line corresponding to line 17—17 of Fig. I, showing further details of the forming mechanism.

Fig. XVIII, sheet 10, is a view of one of the parts shown in Fig. XVII, in another position.

Fig. XIX, sheet 11, is an enlarged fragmentary view mainly in section on a line corresponding to line 19—19 of Fig. I.

Fig. XX, sheet 12, is an enlarged fragmentary view partially in section on a line corresponding to line 20—20 of Fig. XIX.

Fig. XXI, sheet 8, is an enlarged fragmentary view mainly in section on a line corresponding to line 21—21 of Fig. IV.

Fig. XXII, sheet 11, is an enlarged detail in section on a line corresponding to line 22—22 of Fig. XIX, illustrating details of the hook forming means.

Fig. XXIII, sheet 11, is a detail section on a line corresponding to line 23—23 of Fig. XXII.

Fig. XXIV, sheet 11, is a detail section on a line corresponding to line 24—24 of Fig. XXIII.

Fig XXV, sheet 7, is an enlarged view in section on a line corresponding to line 25—25 of Fig. IV, showing details of the stock holding means.

Fig. XXVI, sheet 7, is a detail view partially in elevation and partially in section on a line corresponding to line 26—26 of Fig. XXV; the actuating member being in another position.

Fig. XXVII, sheet 6, is an enlarged detail section on a line corresponding to line 27—27 of Fig. X, showing details of a wire twister pinion bearing.

Fig. XXVIII, sheet 6, is a fragmentary view partially in section on a line corresponding to line 28—28 of Fig. X, showing details of the wire twister pinion actuating means.

Fig. XXIX, sheet 5, is an enlarged view in section on a line corresponding to line 29—29 of Fig. VII, showing further details of the wire twister means.

Fig. XXX, sheet 5, is a section on a line corresponding to line 30—30 of Fig. XXIX.

Fig. XXXI, sheet 5, is an end view of the wire twister the wires being shown in section.

Fig. XXXII, sheet 11, is an enlarged detail section on a line corresponding to line 32—32 of Fig. XIX, showing further details of the hook forming means.

Fig. XXXIII, sheet 11, is an enlarged detail section on a line corresponding to line 33—33 of Fig. XIX, showing further details of the hook forming means.

Fig. XXXIV, sheet 8, is an enlarged detail view in section on a line corresponding to line 34—34 of Fig. VIII, showing the hook forming members in operative position.

Fig. XXXV, sheet 8, is an enlarged view in section on a line corresponding to line 35—35 of Fig. IX, showing the hook forming members in fully actuated position.

Fig. XXXVI, sheet 10, is a detail view similar to a portion of Fig. IV, with the parts in another position.

In the drawings, similar reference numerals designate similar parts. The sectional views are taken looking in the direction indicated by the little arrows at the ends of the section lines.

In general the operation of the machine is as follows:

The stock, a straight piece of wire 40, is placed against the vertically disposed bed plate 41 upon which the several forming operations take place (see Fig. IV). The wires may be placed in operative position manually but are preferably withdrawn one at a time from a wire storage magazine or hopper 42 and delivered to the plate 41 by automatic feed means (see Fig. I).

The first forming operation consists in bending of the wire 40 around mandrels 44 by rotating dies 45 (see Figs. IV and V), the mandrels being spaced the necessary distance to leave the lower bar 46 of the hanger the desired length. The end portions 47 and 48 of the wire are by this operation brought to a crossed position as shown in Fig. V.

The second operation consists in bending the crossed portions of wire between a pair of lateral forming and holding jaws 49 and a vertically reciprocable die member 50, the extreme end portions of wire being left extending upwardly (see Fig. VI). The die member 50 then disengages the wire while a wire twister member 51 engages the upwardly extending portions of wire and turns them to a side-by-side position on the face of the bed plate 41 (see Fig. VII). The jaws 49 now close firmly upon the adjacent portions of wire and hold them tightly together during all of the subsequent forming operations.

For the third operation, the end portions of wire are twisted together by rotation of the twister member 51 as the latter is returned to its initial position (see Fig. VIII).

The wire hook forming mechanism is now projected from a recess in the bed plate 41 into position to operate upon the upwardly extending portions of wire.

By reference to Figs. V to VIII inclusive, it will be noted that the end portion 47 is considerably longer than the portion 48 so that a length of wire 53 is left extending above the twisted portion 54 at completion of the third operation. In the fourth operation this portion 53 is bent to one side by a partial revolution of a forming member 55 which comprises a part of the hook forming mechanism, the wire being engaged by a lug 56 which projects from the end of the member 55 (see Figs. VII and IX). The thrust of this bending operation is received by a lug 57 which projects from a tubular forming member 58 comprising another part of the hook forming mechanism.

The fifth and final forming operation consists in completing the hook 59 by bending the wire portion 53 into the form shown in Fig. X. This is accomplished by further projection of the member 55 and turning of the member 58 through part of a revolution, the lug 57 engaging the wire and bending it around the member 55 which constitutes a mandrel.

After completion of the last forming operation the members 45 and 49, the mandrels 44 and the hook forming members 55 and 58 return simultaneously to initial position (see Fig. IV) thereby permitting the completely formed work to be thrown from the machine by recoil of springs within the member 50, the springs acting upon the wire supporting pins 60 carried thereby. The completed garment hanger is illustrated in Fig. XI.

I shall now give a detail description of the construction and operation of the machine:

A frame plate 61, resting upon frame members 62, provides support for the mechanism which feeds and forms the wire (see Figs. I, II and III). The forming members are attached to the vertically disposed bed plate 41 and are actuated by cam shafts 63 and 64 which are journaled in bearing brackets 65. The shafts 63 and 64 are operatively connected for rotation at the same speed, by a gear train 66. A suitable means of driving the cam shafts comprises a sprocket 67 on the shaft 63, a chain 68, and a sprocket 69 on the drive shaft 70 which is journaled in bearings 71 on the frame pedestals 62. A pulley 73 secured to the shaft 70 is connected with a source of power by a belt 74. By means of a belt shifter 75, the operator may throw the belt upon either the drive pulley 73 or an idle pulley 76 to start or stop the machine as desired. The belt is normally left on the pulley 73 continually while the machine is in action, since an indefinite number of garment hangers may be made without stopping the machine.

The stock magazine or hopper 42 comprises brackets 79 at each end, the brackets being supported by arms 80 which are secured to the bed plate 41 (see Figs. I and II). The wires are held in correct position longitudinally by hopper end plates 81 which are slidably mounted on longitudinal support bars 82, the ends of these bars being secured in the brackets 79. The end plates are held in the desired position on the bars 82 by set screws 83. The end plates are provided with inwardly projecting flanges 84 (see Fig. XII). Additional wire supporting members 85 are mounted on the bars 82 between the end plates (see Figs. I and XIII).

The members 85 have upwardly extending arms 86 and 87 respectively which with the end plates form the upper or storage portion 88 of the hopper 42 (see Figs. XII and XIII). The upper portion of the opposed faces of the arms 86 and 87 are spaced a considerable distance apart to provide ample storage space for stock, but the lower portions of these surfaces gradually converge toward a point 90 at the bottom of the hopper 88 into a wire feeding chute 91 leading downwardly to the wire transfer mechanism (see Figs. XII and XIII). The width of the chute 91 is sufficient to allow but one wire to pass at a time.

The wires 40 drop into the top of the chute 91 by gravity aided by feed rollers 92 which serve to prevent clogging of the wires. The feed rollers are arranged in coacting pairs on shafts 93 which are journaled in the brackets 79, the rollers being secured to the shafts by set screws 94. (See Figs. I and XV). One of the shafts 93 carries an arm 95 which is connected by a rod 96 to a crank pin 97 on the end of the drive shaft 70 (see Figs. I and II). Rotation of the shaft 70 imparts an oscillatory movement to the arm 95. The shafts 93 are operatively connected to each other by a gear train 99 which causes the rollers 92 to oscillate in the same direction (see Fig. XV). Thus the wires are not forced downwardly by the feed rollers but are merely agitated to bring them to a position parallel with the entrance to the feed chute 91 permitting them to drop one at a time into the chute. The periphery of each roller is preferably knurled or otherwise roughened for effective engagement with the wires.

The wires 40 are withdrawn one at a time from the bottom of the feed chute 91 (see Fig. XIII) and delivered to operative position (see Fig. XIV) by the reciprocating transfer members 100. These transfer members are reciprocable in bushings 101 in the bed plate 41 and in bearing brackets 102 secured to the support bars 82 as by set screws 103. The plungers 100 are moved toward the bed plate 41 by springs 104 and returned to receiving position by a cam 105 on the cam shaft 64 (see Figs. I, III and XVI). The cam 105 engages a roller 106 on one end of a lever 107 which is pivoted at 108 to one of the brackets 65. The other end of the lever 107 terminates in a gear segment 109 which engages a driven segment 110 which is secured to a shaft 112 rotatable in bearings 113 in the brackets 65 (see Fig. III). Other segments 114, carried by the shaft 112, engage racks 115 reciprocable in guides 116 which are secured to the brackets 65 (see Figs. III and XIII). The racks 115 are adjustably connected to the plungers 100 by turnbuckles 117.

When the transfer plungers 100 reach receiving position (see Fig. XIII) the bottom wire in the feed chute 91 drops into an annular groove 118 in each of the plungers. When the plungers move toward the bed plate 41 the wire 40 is carried into position to be acted upon by the forming mechanism. (See Fig. XIV). All of the wires except the one in the grooves 118, are held back by guard plates 119 which are secured to the support bars 82 and which form one side of the lower part of the feed chute 91, the groove 118 being of sufficient depth to hold only one wire. The lower edge of each of the guard plates 119, lies closely above one of the plungers 100 and extends nearly to the bed plate 41 to hold the wire 40 in place in the grooves 118 until it is delivered to operative position. While being transferred, the wire is held in correct longitudinal position by guide members 111 which are secured to the hopper end plates 81 (see Figs. I and XII).

When the wire 40 moves into operative position, it overlies a pair of wire bending lugs 120 which project outwardly from the face of the rotary forming dies 45 (see Figs. IV and XVII). The dies 45 are hollow cylinders rotatable in the frame plate 41, the rear portion of each cylinder being in the form of a gear 121 which meshes with a rack 122 (see Figs. XVII and XX).

The racks are urged upwardly by springs 123 on the spring keeper portion 124 of the racks, the springs extending downwardly through openings in the frame plate 61 and being supported by brackets 125 (see Fig. XVII). The upward movement of the racks 122 is limited by stop nuts 126 on the spring keepers 124. The gears 121 are enclosed by housings 128, which are secured to the rear side of the bed plate 41 and which are slotted to form guides for the racks 122. Forward displacement of the gears 121 is prevented by blocks 129 which are secured to the front of the bed plate 41 and which partially cover the forward ends of the members 45 (see Fig. IV). The blocks 129 also serve as stops for limiting the rotation of the members 45, the lugs 120 being in contact with the blocks when in position to receive the wire 40.

A mandrel 44 extends through the center of each of the gears 121 and is reciprocable therein. The mandrel is retracted within the gear while the wire 40 is moving to operative position (see Fig. XVII) but soon after the wire is in place above the lug 120, the mandrel is projected forward so that a ledge 132 on the end of the mandrel overhangs the wire (see Figs. XVII and XVIII). Each of the mandrels is reciprocated by a cam lever 133 to which it is connected by a rod 134, the lever being moved backward by a cam 135 on the cam shaft 64 and forward by a spring 136. The rear portion of the mandrel 44 is rectangular in cross section and extends through a corresponding opening in the gear housing 128 to prevent rotation of the mandrel (see Fig. XX).

After the ledges 132 of the mandrels 44 have been projected over the wire 40, each of the racks 122 is moved downward by a cam lever 138 which has one end pivoted at 139 (see Fig. XVII), the other end engaging a notch 140 in the rack. The lever 138 is actuated by a cam 141 on the cam shaft 63, which engages a roller 142 on the lever. Downward movement of the racks 122 rotates the gears 121 and causes the lugs 120 to bend the wire around the mandrel into the form shown in Fig. V. The wire is supported by the blocks 129 during this bending operation.

When the end portions of the wire 40 are bent toward each other by the forming lugs 120, the left hand portion 48 overruns a deflecting member 144 which is secured to the bed plate 41 (see Figs. V and XXI). The edge of the member 144 engaged by the wire is inclined for the purpose of gradually springing the end of the wire away from the plate 41. Another vertically disposed deflecting member 145 (see Figs. V and XXV) is arranged to engage the right hand end portion 47 and to direct it closely against the bed plate 41 as the wire moves to the position shown in Fig. V. By this means the ends of the wire are caused to pass each other and occupy the crossed position shown. The forming lugs 120 and ledges 132 are slightly undercut to prevent the wire from slipping off the ends of the mandrels 44 (see Figs. XVII and XVIII).

After completion of the operation shown in Fig. V, the laterally slidable forming and clamping jaws 49 engage the wire portions 47 and 48 from both sides. At substantially the same time the centrally located die member 50 is moved upwardly and engages the crossed ends of the wire from underneath. An upwardly extending punch 150 on the die member 50 bends the extreme end portions of the wire up between the inner ends of the jaws 49 to a substantially vertical position. (See Fig. VI.) The jaws also coact with the upper corners 153 of the member 50 to form the shoulder like bends 154 in the wire. When the jaws 49 close upon the wire, the lugs 120 release the wire and are turned to the position shown in Fig. VI where they remain until after completion of the final forming operation.

The wire holding jaws 60 are reciprocable in the member 50 and are urged upwardly therein by springs 156 (see Figs. XXII, XXIII, and XXIV). This upward movement is limited by a shoulder 157 on the lower end of each of the jaws (see Fig. XXIV). The upper end of each of the jaws 60 has a forwardly extending part 158 to provide ample surface for the wire, the top surface of the jaw sloping toward the bed plate 41 to facilitate holding of the wire in position. When the wire is bent to the form shown in Fig. V, the end portions strike upon the parts 158 and are supported thereon. When the jaws 49 have closed upon the wire and the member 50 has moved up into engagement with the wire (see Fig. VI) the wire supporting jaws 60 are forced downwardly in the member 50, the springs 156 being compressed by this movement.

The jaws 49 are secured to slide members 160 which are slidable in slots 161 in the bed plate 41 (see Figs. IV, XX and XXV). When the jaws are in open position (see Fig. IV) the members 160 are yieldingly held against the outer ends of the slots 161 by springs 162 (see Fig. XX). The forming jaws are moved toward each other by cam members 163 carried by the cam shaft 63, the cam members each having a wedge-like portion 164 which engages a roller 165 rotatable on a pin 166 secured to the slide member (see Figs. XXV and XXVI). In Fig. XXVI the cam face 164 is shown in position to engage the roller 165. After being moved to actuated position, the jaws are held in this position by engagement of the roller 165 with a side face 168 of the cam member 163, the roller being finally returned to initial position by a reverse wedge-like cam portion 169.

The die member 50 is vertically reciprocable in a channel 170 in the bed plate 41, the member 50 being held in the channel and guided by a headed stud 171 which extends through a slot 172 in the member 50 (see Figs. XIX and XXIII). The member 50 is normally yieldingly held in its retracted position by a spring 173 which bears against the lower side of the stud 171. The front of the die member 50 is preferably covered by a shield 174 to prevent the completed garment hanger from becoming caught on the stud 171 when expelled from the machine.

The die member 50 is lifted by a cam lever 175 which is pivoted at 176 and actuated by a cam 177 on the shaft 63, the cam engaging a roller 178 on one end of the lever (see Fig. XIX). The other end of the lever 175 extends through a slot 179 in the bed plate 41, the lever terminating in two arms 180 and 181. The arm 180 carries an adjustable tappet 182 which engages the bottom surface of the die member 50.

The lever arm 181 carries an adjustable tappet 184 engaging a wire straightening member 185 which is vertically reciprocable in guides 186 on the bed plate 41 (see Figs. IV and XIX). The member 185 lies underneath the lower reach 46 of the wire 40 between the bending mandrels 44 and is yieldingly held down against the thrust screw 184 by a spring 188 which is anchored to a stationary part of the machine. The member 185 is lifted against the wire 40 at the same time that the die member 50 is actuated since both members are actuated by the lever 175. The purpose of the member 185 is to straighten the lower reach 46 of the wire which is bowed downward by the first bending operation (see Fig. V). It is desirable that this part of the finished product be approximately straight (see Figs. VII and XXI).

After completion of the second operation, the members 50 and 185 are lowered to initial position, the lateral jaws 49 opening slightly to permit withdrawal of the die punch 150 from between the wires. This slight opening of the jaws 49 is caused by a depression 189 in the lateral face 168 of the cam members 163 (see Figs. III, XXV and XXVI).

As soon as the punch 150 has dropped to initial position, the jaws 49 close upon the wires holding them loosely at first while the wire twister member 51 comes into engagement with the end portions of the wire.

The twister member comprises an elongated pinion 190 which is both rotatable and reciprocable in a bearing bracket 192 (see Figs. IV, VII and XIX). A preferred bearing construction consists of an internally toothed sleeve in which the pinion reciprocates vertically, the sleeve being rotatable in a bushing 194 which is secured in the bracket 192 (see Figs. VII and XXVII). The sleeve is held in place on the bed plate 41 by a shoulder 195 in the bushing 194. To aid in maintaining vertical alignment of the pinion 190, an upwardly projecting shaft 196, which is secured to the pinion, extends through a bearing 197 supported by a yoke shaped bracket 198 which is secured to the bed plate 41 (see Figs. I, II, III and IV).

The twister member is reciprocated by a lever 199 which is pivoted at 200 to a supporting arm 201 (see Fig. XIX). One end 202 of the lever is forked and engages trunnions 203 projecting from the sides of a collar 204 which is rotatable on a bushing 205 secured to the upper extension of the pinion 190 (see Fig. VII). The other end of the lever 199 is connected by an adjustable link 206 to a cam lever 207 pivoted at 176 and carrying a roller 208 which is yieldingly held in contact with a cam 209 by a spring 210 (see Fig. XIX).

The twister pinion 190 is rotated by a toothed segment 211 on the rock shaft 212 carried by the bracket 192 (see Figs. XIX and XXVIII). The segment is oscillated by a cam lever 214 with which it is connected by an adjustable link 215. The cam lever carries a roller 216 which is yieldingly held in contact with a cam member 217 on the shaft 63, by a spring 218 (see Figs. III and IV).

The wire twister member 51 is secured to the lower end of the pinion 190. A suitable means of attachment comprises a mortise and tenon joint 220 covered by a collar 221, the parts being held in place by screws 222 (see Figs. XXIX and XXX). When the twister member moves down into engagement with the wire 40, the end portions 47 and 48 of the latter project upward through a central opening 223 in the member 51 and into the hollow interior of the pinion 193. The conical face 224 guides the wires to the opening 223 in the member 51 (see Figs. VII, XXX and XXXI). By reference to Figs. XXIX and XXXI it will be seen that the opening 223 is elongated in cross section, thereby holding the wires side by side. Thus rotation of the member 51 will compel the wires to move about the center of rotation and to wind about each other.

When the twister member 51 first engages the wire, the wire end portions 47 and 48 stand substantially in the positions shown in Fig. VI, the end of the latter being in front of the former. As the twister member moves downward over the wire, it is given a partial turn in a clockwise direction as viewed from above. This slight rotation in the direction described, places the wire portions 47 and 48 side by side against the front surface of the bed plate 41, as shown in Fig. VII. As soon as the end portions of wire reach this position, the jaws 49 close firmly on the wire and hold it tightly during the subsequent forming operations. The twister member 51 is now rotated in a counter clockwise direction and at the same time lifted back to initial position, leaving the wire portions 47 and 48 twisted together as shown at 54 in Fig. VIII.

The wire is next acted upon by the hook-forming mechanism which is illustrated in details in Figs. VIII, IX, X, XIX, XX, XXI and XXXII. The tubular member 58 is rotatable and reciprocable in a bearing 225 which extends through the bed plate 41, one end of the bearing being flush with the front surface of the bed plate. A portion of the member 58 is in the form of a gear 226 which meshes with a rack 227 (see Fig. XXXII), the gear being of sufficient length to maintain driving relation with the rack in all positions of the member 58. The rack 227 is actuated by a segment 228 pivoted at 229 (see Fig. XX), the segment being connected by an adjustable link 230 with a cam lever 231 which is pivoted at 232 (see Fig. IV). The lever 231 carries a roller 233 which is yieldingly held against a cam member 234 by a spring 235.

To provide means of reciprocating the member 58 in the bearing 225, a shifting yoke 236 engaging an annular groove in the member 58 is connected by links 237 with an exterior yoke 238 which is located some distance back of the bed plate 41 (see Figs. XIX, XXI and XXXIII). The links slide in keyway like grooves 239 in opposite sides of the bearing 225, and are attached to the shifting yoke 236 by pins 240. The exterior yoke 238 is actuated by a cam lever 241 with which it is connected by a link 242 (see Fig. XIX). A cam 243 on the shaft 64 engages a roller 244 on the cam lever, the roller being yieldingly held against the cam by a spring 245. The yoke 236 is left open at the top to provide clearance for the rack 227. (See Fig. XXXIII.)

The member 55 is rotated within the member 58 by a rack 246 which engages gear teeth 247 formed in a portion of the periphery of the member 55, the toothed portion being of sufficient extent to permit considerable longitudinal movement without affecting driving relation with the rack (see Figs. XIX, XX and XXI). The rack 246 is urged upwardly by a spring 248 (see Fig. XX) and actuated downwardly by a cam 249 on the shaft 63, the cam engaging a roller 250 on a cam lever 251 which is pivoted at 252 and connected with the rack by a link 253 (see Figs. XIX and XX.)

The member 55 is reciprocated by a cam lever 254 to which it is connected by a link 255 and collar 256 (see Fig. XIX) the collar lying within an arched opening 257 in the yoke 238 (see Fig. XXI and XXXIII). The collar encloses the end of the member 55 and is held in place longitudinally by pins 258 lying in an annular groove 259 in the member 55, the latter being free to rotate within the collar. The cam lever 254 is actuated by a cam 260 with which it is yieldingly held in engagement by a spring 261.

After the wire portions 47 and 48 have been twisted together, the hook forming mechanism is thrust out into engagement with the wire which stands between the lugs 56 and 57 (see Figs. VIII and XXXIV). The member 55 is now turned part of a revolution, thereby causing the lug 56 to bend the length of wire 53 to one side as shown in Fig. IX to form an offset in the hook. Since the reaction of this bending operation is borne by the lug 57, there is a tendency for the member 58 to rotate clockwise and swing the cam lever 231 away from the cam member 234 the low portion 262 of the cam member being in position to engage the cam roller 233 at this time. To prevent the member 58 from being rotated out of position by pressure from the wire, the lever 231 is positively held in engagement with the cam member by a cam lever retainer arm 263 which is carried by the shaft 63 and covers the lever while the first hook forming bend is being made (see Figs. III and XXXVI and dotted outline in Fig. XVI). The retainer arm preferably bears against a renewable wearing face 264 on the cam lever.

When the wire portion 53 has been bent to the position shown in Fig. IX, the retainer arm 261 passes out of engagement with the cam lever 231 which is next engaged by a cam face 265 on the member 234, thereby causing the hook forming member 58 to be turned clockwise. In the meantime the member 55 has been thrust farther outward to the position shown in Fig. XXXV so that the lug 56 is out of range of the wire and a full cylindrical section of the member 55 lies above the wire providing a mandrel like forming member around which the hook is formed. When the member 58 is turned to the position shown in Fig. X, the lug 57 engages the wire portion 53 and bends it around the member 55. This completes the forming of the garment hanger shown in Fig. XI.

During the operations illustrated in Figs. VII to X inclusive, the wire supporting jaws 60 are held partially depressed by the closed position of the jaws 49. After completion of the final forming operation, the wire bending lugs 120 are turned back to initial position (see Fig. IV) and the mandrels 44 retracted back (see Fig. XVII) thereby releasing the bottom part of the garment hanger. The jaws 49 now open quickly, the sudden release of the jaws 60 causing the springs 156 to thrust the jaws upwardly against the stop shoulders 157 with sufficient force to throw the garment hanger off the jaws and hanger falls from the machine and another wire is automatically placed into operative position by the wire feed plungers 100 the machine continuing in motion.

My improved wire working machine is of large capacity, it only being required that the operator shall keep the spring supplied with the stock. The parts of the machine are of quite substantial size so that the machine is strong and durable.

I have illustrated and described my improvements as I have embodied or adapted the same in making a particular form of garment hanger. I have not attempted to illustrate or describe various adaptations of my improvements which I contemplate as I believe the disclosure made will enable those skilled in the art to embody or adapt the same as may be desired.

Having thus described my invention what I claim as new and desire to secure by Letters Patent, is:

1. In a structure of the class described, the combination of a bed plate, formers rotatably mounted on said bed plate and provided with forming lugs projecting from the face of said bed plate, mandrels reciprocating within said formers and notched at one side to receive the wires when the mandrels are projected above said forming lugs, a straightening bar reciprocatingly mounted between said work rests to act upon the work while it is supported by said formers and mandrels, guides for guiding the ends of the wire to a crossed relation as the wire is bent around said mandrels by said formers, a reciprocating form member having a central forming pin, said form member being provided with yielding wire supporting jaws at each side of said pin constituting ejectors for the work, opposed reciprocating forming and holding jaws coacting with said form member to act upon the crossed wires and form the ends thereof to a side by side postion, a wire twister mounted for rotary and axial movement and having a conical recess terminating in a slot-like opening adapted to receive the wires side by side, a pair of concentrically disposed hook former members mounted for rotary and axial movement and provided with forming lugs, the forming lug of the outer member constituting a former block while the wire is acted upon by the forming lug of the inner member, said inner member constituting a mandrel while the wire is acted upon by the forming lug of the outer member, and means for actuating and timing the actuation of said several movable members.

2. In a structure of the class described, the combination of a bed plate, formers rotatably mounted on said bed plate and provided with forming lugs projecting from the face of said bed plate, mandrels reciprocating within said formers and notched at one side to receive the wires when the mandrels are projected above said forming lugs, guides for guiding the ends of the wire to a crossed relation as the wire is bent around said mandrels by said formers, a reciprocating form member having a central forming pin, said form member being provided with yielding wire supporting jaws at each side of said pin constituting ejectors for the work, opposed reciprocating forming and holding jaws coacting with said form member to act upon the crossed wires and form the ends thereof to a side by side position, a wire twister mounted for rotary and axial movement and having a conical recess terminating in a slot-like opening adapted to receive the wires side by side, a pair of concentrically disposed hook former members mounted for rotary and axial movement and provided with forming lugs, the forming lug of the outer member constituting a former block while the wire is acted upon by the forming lug of the inner member, said inner member constituting a mandrel while the wire is acted upon by the forming lug of the outer member, and means for actuating and timing the actuation of said several movable members.

3. In a structure of the class described, the combination of a bed plate, formers rotatably mounted on said bed plate and provided with forming lugs projecting from the face of said bed plate, mandrels reciprocating within said formers and notched at one side to receive the wires when the mandrels are projected above said forming lugs, a straightening bar reciprocatingly mounted between said work rests to act upon the work while it is supported by said formers and mandrels, guides for guiding the ends of the wire to a crossed relation as the wire is bent around said mandrels by said formers, a reciprocating form member, opposed reciprocating forming and holding jaws coacting with said form member to act upon the crossed wires and form the ends thereof to a side by side position, a wire twister mounted for rotary and axial movement and having a conical recess terminating in a slot-like opening adapted to receive the wires side by side, a pair of concentrically disposed hook former members mounted for rotary and axial movement and provided with forming lugs, the forming lug of the outer member constituting a former block while the wire is acted upon by the forming lug of the inner member, said inner member constituting a mandrel while the wire is acted upon by the forming lug of the outer member, and means for actuating and timing the actuation of said several movable members.

4. In a structure of the class described, the combination of a bed plate, formers rotatably mounted on said bed plate and provided with forming lugs projecting from the face of said bed plate, mandrels reciprocating within said formers and notched at one side to receive the wires when the mandrels are projected above said forming lugs, guides for guiding the ends of the wire to a crossed relation as the wire is bent around said mandrels by said formers, a reciprocating form member, opposed reciprocating forming and holding jaws coacting with said form member to act upon the crossed wires and form the ends thereof to a side by side position, a wire twister mounted for rotary and axial movement and having a conical recess terminating in a slot-like opening adapted to receive the wires side by side, a pair of concentrically disposed hook former members mounted for rotary and axial movement and provided with forming lugs, the forming lug of the outer member constituting a former block while the wire is acted upon by the forming lug of the inner member, said inner member constituting a mandrel while the wire is acted upon by the forming lug of the outer member, and means for actuating and timing the actuation of said several movable members.

5. In a structure of the class described, the combination of rotatably mounted formers provided with forming lugs, mandrels reciprocating within said formers, a straightening bar reciprocatingly mounted to act upon the work while it is supported by said formers and mandrels, guides for guiding the ends of the wire to a crossed relation as the wire is bent around said mandrels by said formers, a vertically reciprocating form member provided with yielding wire supporting jaws constituting ejectors when the work is released, opposed reciprocating forming and holding jaws coacting with said form member to act upon the crossed wires and conform the ends thereof to a side by side position, a wire twister mounted for rotary and axial movement having a conical guiding recess terminating in a slot-like opening adapted to receive the wires side by side, and a pair of concentrically disposed hook former members mounted for rotary and axial movement and provided with forming lugs, the forming lug of the outer member constituting a former block while the wire is acted upon by the forming lug of the inner member, said inner member constituting a mandrel while the wire is acted upon by the forming lug of the outer member, and means for actuating and timing the actuation of said several movable members.

6. In a structure of the class described, the combination of a bed plate, formers rotatably mounted on said bed plate and provided with forming lugs projecting from the face of said bed plate, said forming lugs having faces disposed horizontally when the formers are in initial position, mandrels reciprocating within said formers and notched at one side to receive the wires when the mandrels are projected above said former lugs, guides for guiding the ends of the wire to a crossed relation as the wire is bent around said mandrels by said formers, a vertically reciprocating form member having a central forming pin, said form member being provided with yielding jaws at each side of said pin constituting work ejecting means, opposed reciprocating forming and holding jaws coacting with said form member and acting upon the crossed wires to form the ends thereof to a side by side position, means for twisting the said ends together while clamped by said jaws, and means for forming a hook while the work is clamped by said jaws.

7. In a structure of the class described, the combination of a bed plate, formers rotatably mounted on said bed plate and provided with forming lugs projecting from the face of said bed plate, said forming lugs having faces disposed horizontally when the formers are in initial position, mandrels reciprocating within said formers and notched at one side to receive the wires when the mandrels are projected above said former lugs, a vertically reciprocating form member having a central forming pin, said form member being provided with yielding jaws at each side of said pin constituting work ejecting means, opposed reciprocating forming and holding jaws coacting with said form member and acting upon the crossed wires to form the ends thereof to a side by side position, means for twisting the said ends together while clamped by said jaws, and means for forming a hook while the work is clamped by said jaws.

8. In a structure of the class described, the combination of a bed plate, formers rotatably mounted on said bed plate and provided with forming lugs projecting from the face of said bed plate, said forming lugs having faces disposed horizontally when the formers are in initial position, mandrels reciprocating within said formers and notched at one side to receive the wires when the mandrels are projected above said former lugs, and guides for guiding the ends of the wire to a crossed relation as the wire is bent around said mandrels by said formers.

9. In a structure of the class described, the combination of a bed plate, formers rotatably mounted on said bed plate and provided with forming lugs projecting from the face of said bed plate, said forming lugs having faces disposed horizontally when the formers are in initial position, mandrels reciprocating within said formers and notched at one side to receive the wires when the mandrels are projected above said former lugs, work rests disposed in over-lapping relation to said formers, a straightening bar reciprocatingly mounted between said work rests to act upon the work while it is supported by said formers and mandrels, and guides for guiding the ends of the wire to a crossed relation as the wire is bent around said mandrels by said formers.

10. In a structure of the class described, the combination of a bed plate, formers rotatably mounted on said bed plate and provided with forming lugs projecting from the face of said bed plate, said forming lugs having faces disposed horizontally when the formers are in initial position, mandrels reciprocating within said formers and notched at one side to receive the wires when the mandrels are projected above said former lugs, work rests disposed in over-lapping relation to said formers, a straightening bar reciprocatingly mounted between said work rests to act upon the work while it is supported by said formers and mandrels.

11. A structure of the class described comprising rotatable formers provided with forming lugs, mandrels reciprocating within said formers, a straightening bar reciprocatingly mounted to act upon the work while it is supported by said formers and mandrels, guides for guiding the ends of the wire to a crossed relation as the wire is bent around said mandrels by said formers, reciprocating form member, opposed reciprocating forming and holding jaws coacting with said form member and acting upon the crossed wires to form the ends thereof to a side by side position, means for twisting the said ends together while clamped by said jaws, and means for forming a hook while the work is clamped by said jaws.

12. A structure of the class described comprising rotatable formers provided with forming lugs, mandrels reciprocating within said formers, guides for guiding the ends of the wire to a crossed relation as the wire is bent around said mandrels by said formers, reciprocating form member, opposed reciprocating forming and holding jaws coacting with said form member and acting upon the crossed wires to form the ends thereof to a side by side position, means for twisting the said ends together while clamped by said jaws, and means for forming a hook while the work is clamped by said jaws.

13. A structure of the class described comprising rotatable formers provided with forming lugs, mandrels reciprocating within said formers, a straightening bar reciprocatingly mounted to act upon the work while it is supported by said formers and mandrels, reciprocating form member, opposed reciprocating forming and holding jaws coacting with said form member and acting upon the crossed wires to form the ends thereof to a side by side position, means for twisting the said ends together while clamped by said jaws, and means for forming a hook while the work is clamped by said jaws.

14. A structure of the class described comprising rotatable formers provided with forming lugs, mandrels reciprocating within said formers, reciprocating form member, opposed reciprocating forming and holding jaws coacting with said form member and acting upon the crossed wires to form the ends thereof to a side by side position, means for twisting the said ends together while clamped by said jaws, and means for forming a hook while the work is clamped by said jaws.

15. In a structure of the class described, the combination of rotatable formers provided with forming lugs, mandrels reciprocating within said formers, a reciprocating form member having a central forming pin, said form member being provided with yielding jaws at each side of said pin constituting work ejecting means, opposed reciprocating forming and holding jaws coacting with said form member and acting upon the ends of the wires to bring them to a side by side position, means for twisting the said ends together while clamped by said jaws, and means for forming a hook while the work is clamped by said jaws.

16. In a structure of the class described, the combination of rotatable formers provided with forming lugs, mandrels reciprocating within said formers, a reciprocating form member, opposed reciprocating forming and holding jaws coacting with said form member and acting upon the ends of the wires to bring them to a side by side position, means for twisting the said ends together while clamped by said jaws, and means for forming a hook while the work is clamped by said jaws.

17. In a structure of the class described, the combination of rotatable formers provided with forming lugs, mandrels reciprocating within said formers, a reciprocating form member having a central forming pin, said form member being provided with yielding jaws at each side of said pin constituting work ejecting means, opposed reciprocating forming and holding jaws coacting with said form member and acting upon the ends of the wires to bring them to a side by side position, and means for twisting the said ends together.

18. In a structure of the class described, the combination of rotatable formers provided with forming lugs, mandrels reciprocating within said formers, a reciprocating form member, opposed reciprocating forming and holding jaws coacting with said form member and acting upon the ends of the wires to bring them to a side by side position, and means for twisting the said ends together.

19. In a structure of the class described, the combination of a bed plate, formers rotatably mounted on said bed plate and provided with forming lugs projecting from the face of said bed plate, said forming lugs having faces disposed in alinement when the formers are in initial position, reciprocating feed members adapted to deliver the work to the said forming lugs, mandrels reciprocating within said formers and notched at one side to receive the wires when the mandrels are projected above said formers, means for retracting said mandrels to release the work, a straightening bar reciprocatingly mounted on said bed plate to act on the work while it is supported by said formers and mandrels, and automatic means for twisting the ends of the wire together and forming a hook on one of the wires.

20. In a structure of the class described, the combination of a bed plate, formers rotatably mounted on said bed plate and provided with forming lugs projecting from the face of said bed plate, said forming lugs having faces disposed in alinement when the formers are in initial position, reciprocating feed members adapted to deliver the work to the said forming lugs, mandrels reciprocating within said formers and notched at one side to receive the wires when the mandrels are projected above said formers, means for retracting said mandrels to release the work, and automatic means for twisting the ends of the wire together and forming a hook on one of the wires.

21. In a structure of the class described, the combination of a bed plate, formers rotatably mounted on said bed plate and provided with forming lugs projecting from the face of said bed plate, feed means adapted to deliver the work to the said forming lugs, mandrels reciprocating within said formers, means for retracting said mandrels to release the work, guides for guiding the ends of the wire to a crossed relation as it is bent around said mandrels by said formers, and automatic means for twisting the ends of the wire together and forming a hook on one of the wires.

22. In a structure of the class described, the combination of a bed plate, formers rotatably mounted on said bed plate and provided with forming lugs projecting from the face of said bed plate, feed means adapted to deliver the work to the said forming lugs, mandrels reciprocating within said formers, means for retracting said mandrels to release the work, and automatic means for twisting the ends of the wire together and forming a hook on one of the wires.

23. In a structure of the class described, the combination of a bed plate, formers rotatably mounted on said bed plate and provided with forming lugs projecting from the face of said bed plate, feed means adapted to deliver the work to the said forming lugs, mandrels reciprocating within said formers, means for retracting said mandrels to release the work, a straightening bar reciprocatingly mounted on said bed plate to act on the work while it is supported by said formers and mandrels, and automatic means for twisting the ends of the wire together and forming a hook on one of the wires.

24. In a structure of the class described, the combination of rotatably mounted formers provided with forming lugs, mandrels reciprocating within said formers, a work straightening bar reciprocatingly mounted to act upon the work while it is supported by said formers and mandrels, guides for guiding the ends of the wire to a crossed relation as the wire is bent around said mandrels by said formers, a reciprocating form member having a central forming pin, opposed reciprocating forming and holding jaws coacting with said form member and acting upon the crossed wires to bring the ends thereof to a side by side position, means for twisting the said ends together while clamped by said jaws, and means for forming a hook while the work is clamped by said jaws.

25. In a structure of the class described, the combination of rotatably mounted formers provided with forming lugs, mandrels reciprocating within said formers, guides for guiding the ends of the wire to a crossed relation as the wire is bent around said mandrels by said formers, a reciprocating form member having a central forming pin, opposed reciprocating forming and holding jaws coacting with said form member and acting upon the crossed wires to bring the ends thereof to a side by side position, means for twisting the said ends together while clamped by said jaws, and means for forming a hook while the work is clamped by said jaws.

26. In a structure of the class described, the combination of rotatably mounted formers provided with forming lugs, mandrels reciprocating within said formers, a work straightening bar reciprocatingly mounted to act upon the work while it is supported by said formers and mandrels, a reciprocating form member having a central forming pin, opposed reciprocating forming and holding jaws coacting with said form member and acting upon the crossed wires to bring the ends thereof to a side by side position, means for twisting the said ends together while clamped by said jaws, and means for forming a hook while the work is clamped by said jaws.

27. In a structure of the class described, the combination of rotatably mounted formers provided with forming lugs, mandrels reciprocating within said formers, a reciprocating form member having a central forming pin, opposed reciprocating forming and holding jaws coacting with said form member and acting upon the crossed wires to bring the ends thereof to a side by side position, means for twisting the said ends together while clamped by said jaws, and means for forming a hook while the work is clamped by said jaws.

28. A structure of the class described comprising means for bending a wire to bring the ends thereof to a crossed relation, a reciprocating form member having a central forming pin, said form member being provided with yielding jaws at each side of said pin constituting work ejecting means, opposed reciprocating forming and holding jaws coacting with said form member and acting upon the crossed wires to bring the ends thereof to a side by side position, means for twisting the said ends together while clamped by said jaws, and means for forming a hook while the work is clamped by said jaws.

29. A structure of the class described comprising means for bending a wire to bring the ends thereof to a crossed relation, a reciprocating form member, opposed reciprocating forming and holding jaws coacting with said form member and acting upon the crossed wires to bring the ends thereof to a side by side position, and means for twisting the said ends together while clamped by said jaws.

30. In a structure of the class described, the combination of means for bending the wire to bring the ends thereof to a crossed relation with one end longer than the other, a reciprocating form member having a central forming pin, said form member being provided with yielding jaws at each side of said pin constituting work ejecting means, opposed reciprocating forming and holding jaws coacting with said form member and acting upon the crossed wires to bring the ends thereof to a side by side position, means for twisting the said ends together while clamped by said jaws, and means for forming a hook while the work is clamped by said jaws.

31. In a structure of the class described, the combination of means for bending the wire to bring the ends thereof to a crossed relation with one end longer than the other, a reciprocating form member having a central forming pin, said form member being provided with yielding jaws at each side of said pin constituting work ejecting means, and opposed reciprocating forming jaws coacting with said form member and acting upon the crossed wires to bring the ends thereof to a side by side position.

32. A structure of the class described comprising means for bending a wire to bring its ends to crossed relation, a form member, opposed reciprocating forming and holding jaws coacting with said form member acting upon the crossed wires to bring the ends thereof to a side by side position, a wire twister mounted for rotary and axial movement and having a conical guiding recess terminating in a slot-like opening adapted to receive the wires side by side, and a pair of concentrically disposed rotary former members provided with forming lugs, the forming lug of the outer member being adapted to constitute a supporting block while the wire is acted upon by the forming lug of the inner member, said inner member being adapted to constitute a mandrel while the wire is acted upon by the forming lug of the outer member, and means for actuating and timing the actuation of said several movable members.

33. A structure of the class described comprising means for bending a wire to bring its ends to crossed relation, a form member, opposed reciprocating forming and holding jaws coacting with said form member acting upon the crossed wires to bring the ends thereof to a side by side position, a wire twister, and a pair of concentrically disposed rotary former members provided with forming lugs, the forming lug of the outer member being adapted to constitute a supporting block while the wire is acted upon by the forming lug of the inner member, said inner member being adapted to constitute a mandrel while the wire is acted upon by the forming lug of the outer member, and means for actuating and timing the actuation of said several movable members.

34. A structure of the class described comprising a pair of concentrically disposed former members mounted for rotary and axial movement and provided with forming lugs, the forming lug of the outer member being adapted to constitute a supporting block while the wire is acted upon by the forming lug of the inner member, said inner member being adapted to constitute a mandrel while the wire is acted upon by the forming lug of the outer member.

35. A structure of the class described comprising a bed plate, formers rotatably mounted on said bed plate and provided with forming lugs projecting from the face of said bed plate, mandrels reciprocating within said formers and notched at one side to receive the wires when the mandrels are projected above said formers, means for retracting said mandrels to release the work, and a straightening bar reciprocatingly mounted on said bed plate to act on the work while it is supported by said formers and mandrels.

36. A structure of the class described comprising a bed plate, formers rotatably mounted on said bed plate and provided with forming lugs projecting from the face of said bed plate, said forming lugs having faces disposed in alinement when the formers are in initial position, reciprocating feed members adapted to deliver the work to the said forming lugs, mandrels reciprocating within said formers and notched at one side to receive the wires when the mandrels are projected above said formers, and means for retracting said mandrels to release the work.

37. A structure of the class described comprising rotatably mounted formers provided with forming lugs, mandrels reciprocating within said formers, and a work straightening bar reciprocatingly mounted to act upon the work while it is supported by said formers and mandrels.

38. A structure of the class described, comprising a bed plate, formers rotatably mounted on said bed plate, mandrels co-acting with said formers, and guides for guiding the ends of the wire to a crossed relation as the wire is bent around said mandrels by said formers.

39. A structure of the class described comprising a bed plate, a wire twister mounted for rotary and axial movement across the face of said bed plate, means for forming the wire into a hook comprising a pair of eccentrically disposed hook forming members mounted for rotary and axial movement in said bed plate in a plane transverse to the plane of axial movement of said twister, said hook forming members being provided with forming lugs, the forming lug of the outer member constituting a former block while the wire is acted upon by the forming lug of the inner member, the inner member constituting a mandrel while the wire is acted upon by the forming lug of the outer member, and means for rotating and reciprocating said members timed so that they are projected to engage the wire after the twister is retracted, the inner member rotated to initially conform the wire and then projected to constitute a mandrel and the outer member actuated to form the wire around said inner member.

40. A structure of the class described comprising a pair of eccentrically disposed forming members mounted for rotary and axial movement, said forming members being provided with forming lugs, the forming lug of the outer member constituting a former block while the wire is acted upon by the forming lug of the inner member, the inner member constituting a mandrel while the wire is acted upon by the forming lug of the outer member, and means for rotating and reciprocating said members timed so that they are projected to engage the wire, the inner member rotated to initially conform the wire and then projected to constitute a mandrel and the outer member actuated to form the wire around inner member.

41. A structure of the class described comprising a pair of eccentrically disposed forming members provided with forming lugs, the forming lug of the outer member constituting a former block while the wire is acted upon by the forming lug of the inner member, the inner member constituting a mandrel while the wire is acted upon by the forming lug of the outer member, and means for rotating and reciprocating said inner member timed so that the inner member is rotated to initially conform the wire and then projected to constitute a mandrel and means for rotating the outer member to form the wire around said inner member.

In witness whereof I have hereunto set my hand.

HERMAN KUESTER. [L. S.]